(12) United States Patent
Huber

(10) Patent No.: US 9,085,834 B2
(45) Date of Patent: Jul. 21, 2015

(54) AIRBAG AND METHOD FOR MANUFACTURING A FABRIC FOR AN AIRBAG

(75) Inventor: Norbert Huber, Bad Säckingen (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 1722 days.

(21) Appl. No.: 12/086,685

(22) PCT Filed: Dec. 21, 2006

(86) PCT No.: PCT/EP2006/012405
§ 371 (c)(1),
(2), (4) Date: Nov. 26, 2008

(87) PCT Pub. No.: WO2007/076961
PCT Pub. Date: Jul. 12, 2007

(65) Prior Publication Data
US 2009/0224521 A1    Sep. 10, 2009

(30) Foreign Application Priority Data

Dec. 21, 2005 (DE) .......... 10 2005 061 351

(51) Int. Cl.
  *D03D 15/02* (2006.01)
  *D03D 1/02* (2006.01)
  *D03D 5/00* (2006.01)
  *D03D 13/00* (2006.01)
  *B60R 21/235* (2006.01)

(52) U.S. Cl.
  CPC .. *D03D 1/02* (2013.01); *D03D 5/00* (2013.01); *D03D 13/008* (2013.01); *D03D 15/02* (2013.01); *B60R 2021/23542* (2013.01); *D10B 2401/041* (2013.01); *Y10T 428/24785* (2015.01); *Y10T 428/24942* (2015.01)

(58) Field of Classification Search
  CPC .............. B32B 3/02; B32B 5/10; D03D 1/02; D03D 5/00; D03D 13/008; D03D 15/02; D10B 2505/124; B60R 2021/23542; Y10T 428/24942
  USPC .......................................... 442/190, 191, 197
  See application file for complete search history.

(56) References Cited

U.S. PATENT DOCUMENTS 3,456,692 A    7/1969   Kronoff
3,460,583 A    8/1969   Mosher
(Continued)

FOREIGN PATENT DOCUMENTS

DE    39 03 216 A1    8/1990
DE    198 52 232 A1    5/2000
(Continued)

*Primary Examiner* — Elizabeth Cole
(74) *Attorney, Agent, or Firm* — Pearne & Gordon LLP

(57) ABSTRACT

Method for manufacturing a woven fabric for an airbag for passenger restraint systems for motor vehicles, characterized via the steps of preparing a group of warp yarns composed of warp yarns (24, 26) of different yarn qualities, having first warp yarns (24) and having second warp yarns (26) which are arranged in selected regions (ZK) of the group of warp yarns and are made of hybrid yarn which has first filaments (61) and second filaments (62), weaving the fabric with at least one weft yarn quality, and thermal, mechanical or chemical treatment of the fabric in such a way that the second filaments lose their filament structure, become an amorphous mass and connect the first filaments to one another.

10 Claims, 1 Drawing Sheet

(56) References Cited

U.S. PATENT DOCUMENTS

| | | |
|---|---|---|
| 3,996,971 A | 12/1976 | Griffith et al. |
| 4,004,616 A | 1/1977 | Andronov et al. |
| 4,174,738 A | 11/1979 | Berger et al. |
| 4,313,473 A | 2/1982 | Reiter |
| 4,565,535 A | 1/1986 | Tassy et al. |
| 4,660,605 A | 4/1987 | Koch |
| 5,094,477 A | 3/1992 | Togawa |
| 5,299,603 A | 4/1994 | Reiter et al. |
| 5,333,899 A | 8/1994 | Witte et al. |
| 5,560,648 A | 10/1996 | Rhule et al. |
| 5,654,067 A | 8/1997 | Dinger et al. |
| 5,685,347 A | 11/1997 | Graham et al. |
| 5,700,532 A | 12/1997 | Chiou |
| 5,707,711 A | 1/1998 | Kitamura |
| 5,769,130 A | 6/1998 | Brielman |
| 5,789,084 A | 8/1998 | Nakamura et al. |
| 5,952,250 A | 9/1999 | Kim et al. |
| 6,007,092 A | 12/1999 | Martz |
| 6,024,380 A | 2/2000 | Kim et al. |
| 6,177,365 B1 | 1/2001 | Li |
| 6,177,366 B1 | 1/2001 | Li |
| 6,220,309 B1 | 4/2001 | Sollars, Jr. |
| 6,265,690 B1 | 7/2001 | Förnsel et al. |
| 6,299,206 B1 | 10/2001 | Keshavaraj |
| 6,429,155 B1 | 8/2002 | Li et al. |
| 6,451,715 B2 | 9/2002 | Li et al. |
| 6,467,802 B2 | 10/2002 | Heigl |
| 6,569,788 B1 | 5/2003 | Hurst et al. |
| 6,595,244 B1 | 7/2003 | Sollars, Jr. |
| 6,632,753 B1 | 10/2003 | Beasley, Jr. |
| 6,641,165 B2 | 11/2003 | Ohhashi |
| 6,645,565 B2 | 11/2003 | Veiga |
| 6,698,458 B1 | 3/2004 | Sollars, Jr. et al. |
| 6,701,971 B1 | 3/2004 | Sollars, Jr. et al. |
| 6,705,244 B1 | 3/2004 | Berger et al. |
| 6,734,124 B1 | 5/2004 | Hurst et al. |
| 6,753,275 B2 | 6/2004 | Veiga |
| 6,770,578 B2 | 8/2004 | Veiga |
| 6,866,068 B2 | 3/2005 | Berger et al. |
| 6,883,557 B1 | 4/2005 | Eschbach et al. |
| 6,918,410 B1 | 7/2005 | Berger et al. |
| 6,918,411 B2 | 7/2005 | Berger et al. |
| 6,932,120 B2 | 8/2005 | Busskamp et al. |
| 6,994,125 B2 | 2/2006 | Trondle et al. |
| 7,069,961 B2 | 7/2006 | Sollars, Jr. |
| 7,179,762 B1 | 2/2007 | Beasley, Jr. |
| 7,409,970 B2 | 8/2008 | Sollars |
| 2001/0030416 A1 | 10/2001 | Tanabe et al. |
| 2001/0048219 A1 | 12/2001 | Heigl |
| 2001/0049243 A1 | 12/2001 | Crouch et al. |
| 2002/0033589 A1 | 3/2002 | Barnes |
| 2002/0037755 A1 | 3/2002 | Rodemer et al. |
| 2002/0043792 A1 | 4/2002 | Keshavaraj |
| 2002/0060449 A1 | 5/2002 | Keshavaraj |
| 2002/0125702 A1 | 9/2002 | Ohhashi |
| 2002/0140218 A1 | 10/2002 | Beasley |
| 2003/0060104 A1 | 3/2003 | Veiga |
| 2003/0129339 A1 | 7/2003 | Barnes |
| 2003/0166367 A1 | 9/2003 | Berger et al. |
| 2004/0182468 A1 | 9/2004 | Trondel et al. |
| 2004/0200540 A1 | 10/2004 | Busskamp et al. |
| 2005/0161919 A1 | 7/2005 | Berger et al. |
| 2006/0005913 A1 | 1/2006 | Berger |
| 2006/0014456 A1 | 1/2006 | Li |
| 2006/0151882 A1 | 7/2006 | Trondel et al. |
| 2007/0149072 A1* | 6/2007 | Wang et al. ............ 442/59 |
| 2007/0278775 A1 | 12/2007 | Ting et al. |
| 2008/0147278 A1 | 6/2008 | Breed |

FOREIGN PATENT DOCUMENTS

| Country | Number | Date |
|---|---|---|
| DE | 198 57 034 | 8/2000 |
| DE | 200 09 237 U1 | 9/2000 |
| DE | 102 55 360 A1 | 6/2004 |
| EP | 0477521 | 4/1992 |
| EP | 0 733 732 | 9/1996 |
| EP | 1 238 867 | 9/2002 |
| GB | 2 251 410 | 7/1992 |
| GB | 2251410 A * | 7/1992 |
| JP | 3082645 | 4/1991 |
| JP | 10-187045 | 7/1998 |
| WO | WO-02/070252 | 9/2002 |
| WO | WO 2004/042128 | 5/2004 |
| WO | WO 2004/048658 | 6/2004 |
| WO | WO 2005068266 A1 * | 7/2005 |
| WO | WO 2007/070465 | 6/2007 |

* cited by examiner

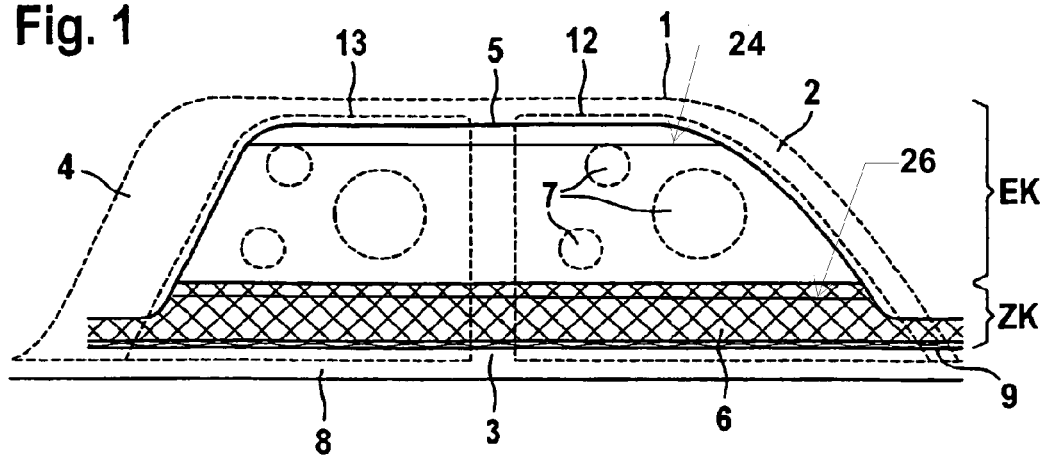

AIRBAG AND METHOD FOR MANUFACTURING A FABRIC FOR AN AIRBAG

The present invention relates to an air bag and method for manufacturing a woven fabric for an air bag for vehicular passenger restraint systems.

On being deployed, air bags for vehicular passenger restraint systems develop three-dimensionally due to being filled, resulting in a shortening of the length of the textile tubular element as exists in the two-dimensional configuration. The inflated air bag acts as a barrier between a vehicle occupant to be cushioned thereby and some component in the interior of the motor vehicle. Normally the textile tubular element of the air bag has no longitudinal or transverse stiffness of its own and thus fails to form a barrier of any great stability. It is particularly in the deployment of a side curtain air bag that a shortening of the textile tubular element occurs due to the three-dimensional development, resulting in a barrier effect extending from the A pillar to the C pillar of a motor vehicle, the textile tubular element having practically no longitudinal stiffness of its own and thus lacking a stable continuation from the top shoulder to the roof railing.

Air bag systems for protecting motor vehicle occupants from the side, i.e. side curtain air bag systems, are designed so that after deployment of the air bag the side portion of the passenger compartment below the window is used as a support to prevent catapulting the extremities of a vehicle occupant posing an increased risk of injury. This requires the side air bag needing to be designed larger than actually wanted for protection, causing a waste of material and production costs.

Car makers require an improvement in vehicle occupant protection by a side curtain air bag, the performance of which is intended to prevent catapulting injury to the occupant or limbs thereof during or subsequent to the vehicle being involved in a crash situation.

The invention is based on the object of proposing an air bag, a fabric for an air bag and a method for manufacturing a woven fabric for an air bag for vehicular passenger restraint systems with which the disadvantages known from prior art are avoided or at least greatly reduced.

This object is firstly achieved by an air bag as set forth in claim 1, namely an air bag for vehicular passenger restraint systems featuring an upper edge for securing the air bag to the roof portion of the motor vehicle and a lower edge comprising woven plies of fabric, the warp threads of which extend substantially parallel to the lower edge, characterized in that the plies are woven fully or portionally with monofilament or monofilament-type warp threads.

This avoids, or at least greatly reduces, the disadvantage of prior art of the air bag being too large in thus involving high costs, because now, by designing the air bag with monofilament or monofilament-type warp threads a stiffness of its own is now achieved, parallel to the lower edge, making it possible to reduce the height and thus the material and production costs of the air bag, since support of the air bag by the top shoulder below the window of the motor vehicle is no longer needed. In addition to this (as formerly needed in prior art) there is now no need for deployment to pass the inwards projection of the top shoulder, in other words the air bag can now be deployed straight down without ramping, in thus eliminating the vehicle occupant experiencing a possible side jolt of the air bag. Another advantage materializes by the air bag in accordance with the invention in that in some applications tapes can now be eliminated formerly needed to tether the air bag between two anchoring locations. These tapes are now superfluous due to the native stiffness of the air bag longitudinally.

In one advantageous further embodiment of the invention the air bag is characterized by upper portions (EK) bordering the upper edge with first multifilament warp threads and lower portions (ZK) bordering the lower edge with second monofilament or monofilament-type warp threads, enabling the air bag to be tailored to the particular requirements. When longitudinal stiffness is not so important in the upper part of the air bag, this variant is of advantage whilst in addition saving material and production costs.

In another advantageous further embodiment of the invention the air bag is characterized in that the monofilament-type warp threads are made of hybrid yarn or hybrid multifilament yarn comprising at least first filaments and second filaments, the monofilament-type warp threads being treated such that the second filaments have lost their filament structure by thermal, mechanical or chemical treatment of the fabric in becoming an amorphous mass and connecting the first filaments to each other. This air bag can now be manufactured even more substantially cost-effectively because the hybrid yarn can be woven like a multifilament yarn with all its advantages as compared to a stiffer monofilament yarn.

Hybrid yarn and respectively hybrid multifilament yarn is known from, for example, DE 102 55 360 A1.

In a further advantageous embodiment of the invention the air bag is characterized in that it is a one-piece woven (OPW) air bag. The advantage of this is as follows: an OPW air bag can be fully woven on the weaving machine whereas an air bag stitched from fabric needs to go through substantially more steps in processing up to the fully finished condition.

When side curtain air bags are woven as OPW bags from a monofilament warp thread, warp manufacturing by the multistage Zettel assembly method, for example, is favorable.

The object is furthermore achieved by a method as it reads from claim 5 wherein the leading feature is employing warp threads of hybrid yarn, comprising first filaments and second filaments which after weaving of the fabric are treated such that the second filaments have lost their filament structure by thermal, mechanical or chemical treatment of the fabric in becoming an amorphous mass and connecting the first filaments of the hybrid warp threads to each other into a filament yarn element. This improves vehicle occupant protection by a side curtain air bag having a substantially more stable performance longitudinally. The disadvantages known from employing monofilament warp threads are overcome by making use of multifilament hybrid yarns, now making it possible to advantage to achieve employment of warps having differing yarn zones to create "catchment dome structures" in zones with normal yarn in the scope of a corresponding design.

Further advantages materialize in accordance with the invention from configuring a fabric for an air bag in a strengthened woven seam, this in addition making for particularly good savings in cost. This is because of the pore size being reduced by second filaments having become an amorphous mass, a lower permeability to air is now achieved which in turn results in a lower requirement of coating material respectively in a thinner coating film. As regards the possible variation in the design elements (warp templates, woven seam design, catchment dome, tether, weft sequence) the advantages afforded by the flexibility of a "colored Jacquard weave" are outstanding.

A side curtain air bag in accordance with the invention, made e.g. of an air bag material manufactured by a method in accordance with the invention has, as a rule, the function of deploying downwards from a stowed position located in the region of the roof railing of a motor vehicle along the window surface of the vehicle. In the case of and following this deployment it is tensioned from the A pillar to the C pillar in thereby protecting the head of the vehicle occupant on this side of the vehicle both in the front seat and in the rear seat should the vehicle be involved in a side impact collision.

It is emphasized quite generally that the gist of the invention is to be appreciated in that in a stitched or OPW air bag a monofilament, a coarse fibrillated multifilament and/or a hybrid yarn having received a monofilament-type character by thermal, mechanical or chemical treatment is incorporated substantially perpendicular to the direction of deployment, i.e. generally in the longitudinal direction, in other words depending on the lay in which the air bag is produced on the weaving machine (in the warp or weft direction). The cited yarn materials can be incorporated exclusively or alternatingly with other yarns over the full width of the air bag, resulting in the full surface or just partially being stiffened, e.g. like a tape, preferably in the region of the lower edge of the air bag as is moved downwards to the top shoulder of the motor vehicle when deployed, replacing the need of the air bag to be supported by the vehicle structure.

It is understood that when reference is made in this description to air bags, side air bags and side curtain air bags, these designations make no difference in the sense of the invention which, in particular, also includes front air bags such as knee air bags as may be employed in a corresponding configuration of a vehicle (such as e.g. also including a bus or a rail vehicle).

Further features and advantages of the invention read from the sub-claims.

For a better understanding of the present invention it will now be detailed by way of an example embodiment with the assistance of the drawing in which FIG. 1 is a diagrammatic side view of a side curtain bag in accordance with the invention.

FIG. 2 is top-down diagrammatic illustration of a side air bag.

FIG. 3 is a diagrammatic section view of a fabric structure including a woven seam.

FIG. 4 is a diagrammatic illustration of a hybrid yarn before heat treatment.

FIG. 5 is a diagrammatic illustration of a hybrid yarn after heat treatment.

Since the machines, means, apparatuses and materials needed to perform the method in accordance with the invention are all known to the person skilled in the art, these are not detailed or shown in the following.

The invention involves, among other things, a method for manufacturing a woven fabric for an air bag for vehicular passenger restraint systems, characterized by the following steps:

preparing an array of warp threads from warp threads of differing yarn qualities, comprising first warp threads and second warp threads arranged in selected portions of the warp thread array of a hybrid yarn comprising first filaments and second filaments, weaving the fabric with at least one weft thread quality, treating the fabric thermally, mechanically or chemically such that the second filaments lose their filament structure in becoming an amorphous mass and connecting the first filaments to each other into a monofilament-type filament yarn element.

In an advantageous further embodiment of the method in accordance with the invention the method includes the following further step:

heating the fabric to a temperature which is lower than the melting point of the first filaments and higher than the melting point of the second filaments, the melting point of the first filaments being higher than the melting point of the second filaments, the melting point of the first warp threads being higher than the melting point of the second filaments, cooling the fabric to a temperature lower than the melting point of the second filaments.

A further advantageous aspect of the method in accordance with the invention is characterized by the following step:

calandering or tumbling the fabric such that the second filaments having accumulated on the surface of the fabric are activated and the first filaments are connected to each other.

A further advantageous aspect of the method in accordance with the invention is characterized by chemically solutionizing the second filaments such that the first filaments are interconnected.

In a further aspect of the method in accordance with the invention the steps thereof in thermally, mechanically or chemically treating the fabric are employed in combination.

To advantage, in a further embodiment of the method in accordance with the invention a OPW air bag for vehicular passenger restraint systems is characterized in that it is fabricated at least in part by the method as it reads from any of the claims 1 to 5.

In yet another advantage embodiment of the invention an air bag for manufactured in accordance with the method as claimed is put to use in air, land and sea vehicles.

Referring now to FIG. 1 there is illustrated by way of an example an air bag in accordance with the invention as well as a fabric manufactured by the method in accordance with the invention along with an air bag made therefrom—in this case in the form of a OPW air bag for vehicular passenger restraint systems—wherein the broken lines 1 represent diagrammatically a side view of the passenger compartment of an automobile, viewing it outwards from the middle of the passenger compartment to the left and assuming that the vehicle as shown is travelling forwards from the right-hand side of the drawing. Shown stylized are an A pillar 2, a B pillar and a C pillar. These A, B and C pillars framing with a top shoulder 8 the side windows 12 and 13. These side windows 12 and 13 are covered by a curtain bag 5 extending from the A pillar to the C pillar shown here deployed. The curtain bag 5 as shown in FIG. 1 comprises a horizontal run of first warp threads 24 incorporated in the portion EK and a horizontal run of second warp threads 26 incorporated in the portion ZK. The second warp threads 26 are made of hybrid yarn comprising first filaments 61 and second filaments 62 running in the hybrid yarn multiple-wound parallel to the longitudinal centerline of the yarn. A random section view of a hybrid yarn shown on a greatly magnified scale is illustrated diagrammatically in FIG. 4 comprising multiple-wound first filaments 61, represented here as a large diameter circle and second filaments 62 represented by contrast as a smaller diameter circle.

Referring now to FIGS. 4 and 5 there is illustrated the situation of a hybrid yarn before and after heat treatment respectively. Still fully evident are the first filaments 61 whereas the second filaments 62 are no longer evident as such, they having become an amorphous mass marrying the first filaments 61, this mass consisting of the material of the former second filaments 62 interconnecting the first filaments 61. The situations as shown in FIGS. 4 and 5 are to be appreciated merely qualitatively and diagrammatically, i.e. the real thing may look totally different, but the functioning principle is the same.

In a fabric in accordance with the invention respectively in a fabric made by a method in accordance with the invention hybrid yarn 26 is incorporated in at least one thread system fully or partly. This hybrid yarn 26 comprises filaments 61 and 62 having differing melting points T1 and T2, meaning that when the yarn material is exposed to heat exceeding the melting point T2 of the second filament 62 but lower than the higher melting point T1 of the filament 61, then the filaments 61 in the hybrid yarn 26 melt whereas the filaments 61 having the higher melting point T1 remain unmelted. When the yarn material cools, the melted proportions of the second filaments 62 solidify, interconnecting the non-melted filaments 61.

It is in this way that the once multifilament hybrid yarn 26 incorporated as the warp thread receives a monofilament character by the single filaments 62 being bonded to each other, resulting in an increase in the longitudinal stability of the side curtain air bag strived for as the object of the invention.

To produce the fabric in accordance with the invention a multifilament hybrid yarn is worked in all stages of fabricating the material, meaning the filaments 62 having the low melting point T2 are still present in the yarn 26 as fibers. After its production the fabric is exposed to the heat treatment as described above, resulting in the incorporated hybrid yarns 26 receiving the monofilament character as just described. When this fabric is put to use in a OPW air bag or in sheet fabric for stitched air bags it retains its longitudinal stability in application as a component even when deflating.

The size and arrangement of the longitudinally stable zones 6 (as shown in FIG. 1) can be tailored to the design of the side air bag.

In the portion EK in which so-called catchment domes 7 (as shown in FIG. 1 and FIG. 2) are incorporated, warp and weft consist of so-called normal yarn, a yarn which is regularly employed for side air bags.

As aforementioned in an advantageous further embodiment of the method in accordance with the invention interconnecting filaments of the hybrid yarn can also be done chemically, resulting in the surfaces of an array of filaments of the hybrid yarns being solutionized and the fibers subsequently interconnected.

In a further variant it is also feasible to interconnect the first and second filaments of the hybrid yarn mechanically. This is done, for example, by calandering or tumbling, resulting in a surface accumulated adhesive—analogous the second filaments 62—being activated, interconnecting the fibers—analogous the first filaments 61.

In yet another variant of the method filaments in the fabric can be interpressed or connected mechanically, for example by calandering or water jet compression, resulting in individual filaments receiving with each other a monofilament character.

That the aforementioned variants can be combined to advantage has already been stressed.

In accordance with the invention the longitudinally stable zones 6 of an air bag manufactured by a method in accordance with the invention may apply to the warp system as a whole, to portions thereof or also just to a ply of the fabric.

Referring now to FIG. 3 there is illustrated how a woven seam 9 depicted diagrammatically in section as a single-ply portion made from a hybrid yarn on the warp also features a higher longitudinal stability because of the resulting higher set which is of advantage as regards the problem zone in the region of the top shoulder of a motor vehicle.

Referring still to FIG. 3 there is illustrated diagrammatically the transition of a two-ply weave into a single-ply weave—woven seam 9—with the upper weave 10 and lower weave 11 present in the region of the two-ply weave. In this illustration the solid lines represent the weft threads and the circles stand for the warp threads coming out of the plane of the drawing. In accordance with the invention the woven warp is produced by the sectional warping method from normal and hybrid multifilament yarn. Weaving in making use of two beams is known from Jacquard technology.

In another variant of the method in accordance with the invention exclusive use of a multifilament yarn is made in the weft as is known in prior art, i.e. in the height direction of the air bag as is vertical in FIG. 1. As is likewise known to the person skilled in the art this achieves folding of the curtain bag with no problem. In an advantageous further embodiment of the method in accordance with the invention a hybrid yarn can be incorporated by ways and means as described above in the weft direction. Although this would mean making foldability somewhat difficult, it makes for added stability vertically in the air bag.

The fabric is washed and dried as is known from prior art. The concluding setting process results in fusing of the low-temperature filaments with the hightemperature filaments in the warp as well as with the intersecting weft threads. Formed in this arrangement in hybrid warp threads incorporated in a symmetrical ondulation are intersections having an elliptical cross-section generating a particularly elastic stability because of the fusing.

The invention claimed is:

1. A side curtain air bag for vehicular passenger restraint systems, the side curtain airbag comprising:
   a one-piece woven (OPW) curtain bag defining a single inflatable chamber with a geometry extending along a longitudinal direction between an A-pillar and a C-pillar of an automobile, the curtain bag further comprising:
      an upper edge with an upper portion bordering the upper edge, the upper portion having multifilament warp threads extending along said longitudinal direction to provide the single inflatable chamber of the curtain bag with a first longitudinal stiffness along the upper portion; and
      a lower edge with a lower portion bordering the lower edge comprising woven plies of fabric having weft threads and warp threads wherein the warp threads extend along said longitudinal direction and substantially parallel to the lower edge, and wherein the woven plies of fabric in the lower portion are woven fully or portionally with monofilament warp threads to provide the single inflatable chamber of the curtain bag with a second longitudinal stiffness along the lower portion, and
      wherein the second longitudinal stiffness is greater than the first longitudinal stiffness.

2. The side curtain air bag of claim 1, wherein the upper portion is formed of non-hybrid yarn comprising non-hybrid warp threads and non-hybrid weft threads.

3. The side curtain air bag of claim 1, wherein the upper portion further comprises one or more dome-shaped structures therein.

4. The side curtain air bag of claim 1, wherein the monofilament warp threads initially comprise a hybrid yarn comprising first filaments and second filaments, and the second filaments have subsequently lost their filament structure by thermal, mechanical or chemical treatment of the fabric to thereby become an amorphous mass and connecting the first filaments to each other.

5. The side curtain air bag of claim 4, wherein the first filaments having a higher melting point than the second filaments.

6. The side curtain air bag of claim 5, wherein the first and second filaments are wound in parallel to a center line of the hybrid yarn.

7. A side curtain air bag for vehicular passenger restraint systems, the side curtain air bag comprising:
    a one-piece woven (OPW) curtain bag defining a single inflatable chamber with a geometry extending along a longitudinal direction between an A-pillar and a C-pillar of an automobile, the curtain bag further comprising:
        an upper portion having first warp yarns extending along said longitudinal direction to provide the single inflatable chamber of the curtain bag with a first longitudinal stiffness along the upper portion; and
        a lower portion having second warp yarns different than the first warp yarns and extending along said longitudinal direction to provide the single inflatable chamber of the curtain bag with a second longitudinal stiffness along the lower portion, the second warp yarns comprising a hybrid yarn having first and second filaments,
    wherein the upper and lower portions are woven with at least one weft yarn, and
    wherein the air bag is thermally, mechanically, or chemically treated such that the second filaments are an amorphous mass that combines the first filaments with each other so that the second longitudinal stiffness is greater than the first longitudinal stiffness.

8. A side curtain air bag for vehicular passenger restraint systems, the side curtain airbag comprising:
    a one-piece woven (OPW) curtain bag defining a single inflatable chamber with a geometry extending along a longitudinal direction between an A-pillar and a C-pillar of an automobile, the curtain bag further comprising:
        an upper edge comprising an upper portion bordering the upper edge, the upper portion having multifilament warp threads to provide the single inflatable chamber of the curtain bag with a first longitudinal stiffness; and
        a lower edge comprising a lower portion bordering the lower edge comprising woven plies of fabric having weft threads and warp threads wherein the warp threads extend substantially parallel to the lower edge, and wherein the woven plies of fabric are woven fully or portionally with monofilament warp threads to provide the single inflatable chamber of the curtain bag with a second longitudinal stiffness,
    wherein the second longitudinal stiffness of the single inflatable chamber is greater than the first longitudinal stiffness of the single inflatable chamber.

9. The side curtain air bag of claim 8, wherein the upper portion is formed of non-hybrid yarn comprising non-hybrid warp threads and non-hybrid weft threads.

10. The side curtain air bag of claim 8, wherein the upper portion further comprises one or more dome-shaped structures therein.

* * * * *